US007962903B1

(12) United States Patent
Ross

(10) Patent No.: US 7,962,903 B1
(45) Date of Patent: Jun. 14, 2011

(54) SYSTEMS AND METHODS FOR PROCESSING MESSAGE SUBSCRIPTIONS USING PRE-COMPILED CODE-BLOCKS FOR EFFICIENT EXPRESSION EVALUATION

(76) Inventor: Richard A. Ross, Berkeley, CA (US)

( * ) Notice: Subject to any disclaimer, the term of this patent is extended or adjusted under 35 U.S.C. 154(b) by 1030 days.

(21) Appl. No.: 11/758,204

(22) Filed: Jun. 5, 2007

(51) Int. Cl.
*G06F 9/45* (2006.01)
*G06F 3/00* (2006.01)
(52) U.S. Cl. .................... 717/140; 715/751; 715/758
(58) Field of Classification Search .......... 717/140–143, 717/151–156; 715/751, 758
See application file for complete search history.

(56) References Cited

U.S. PATENT DOCUMENTS 6,144,987 A * 11/2000 Niemi ........................ 709/201
7,750,913 B1 * 7/2010 Parenteau et al. ............ 345/502
2004/0193915 A1 * 9/2004 Smith et al. .................. 713/200
2006/0123425 A1 * 6/2006 Ramarao et al. ............. 719/313
2007/0156919 A1 * 7/2007 Potti et al. .................... 709/238
2008/0005547 A1 * 1/2008 Papakipos et al. ............ 712/244

* cited by examiner

*Primary Examiner* — Philip Wang
*Assistant Examiner* — Chung Cheng
(74) *Attorney, Agent, or Firm* — North Shore Patents, P.C.; Michele Liu Baillie

(57) ABSTRACT

Systems and methods for processing message subscriptions using pre-compiled code-blocks for expression evaluation. In one embodiment, a system is configured find a set of unique clauses in a set of expressions representing message subscriptions, express the expressions as Boolean functions of the unique clauses, and compile the Boolean functions into a set of assembly instructions for efficient expression evaluation. In another embodiment, a system is configured to receive a message, generate a set of True/False assignments to a set of clauses in a set of expressions, and evaluate the expressions using an efficient compiled expression evaluation code-block.

18 Claims, 4 Drawing Sheets

```
...
<trade>
 <stock>
   <name>IBM</name>
   <price>$150</price>
   ...
 </stock>
</trade>
...
```

SYSTEMS AND METHODS FOR PROCESSING MESSAGE SUBSCRIPTIONS USING PRE-COMPILED CODE-BLOCKS FOR EFFICIENT EXPRESSION EVALUATION

CROSS REFERENCE TO RELATED APPLICATIONS

This application is related to co-pending U.S. patent application Ser. No. 11/749,675, entitled "JNI-Minimizing Data Structures for XML Parsing" by Richard A. Ross, filed on May 16, 2007, which is incorporated herein by reference in its entirety.

BACKGROUND

1. Field

The present invention relates to data processing, and in particular to just-in-time code compilation for efficient processing of XML messages.

2. Related Art

Conventional Extended Markup Language (XML) message processors typically process incoming messages according to a dynamic set of subscriptions in order to determine which messages should be sent to which subscribers. A message subscription generally comprises a Boolean function of a set of clauses, and the evaluation of the Boolean functions represents a repeating computation in XML message processing. While such processing works well, it suffers from sub-optimal performance because the expression evaluations are performed in a high-level programming language code as the set of subscriptions evolve during run-time.

Accordingly, there exists a need for performing efficient expression evaluations at run-time.

SUMMARY

Embodiments of the present invention are directed to systems and methods for processing message subscriptions using pre-compiled code-blocks for efficient expression evaluation. In one embodiment, a system is configured at to find a set of unique clauses in a set of expressions representing message subscriptions, express the expressions as Boolean functions of the unique clauses, and compile the Boolean functions into a set of assembly instructions for efficient expression evaluation at run-time. In another embodiment, a system is configured to receive a message, generate a set of True/False assignments to a set of clauses in a set of expressions, and evaluate the expressions using an efficient compiled expression evaluation code-block.

BRIEF DESCRIPTION OF DRAWINGS

The drawings illustrate the design and utility of embodiments of the present invention, in which similar elements are referred to by common reference numerals. In order to better appreciate the advantages and objects of the embodiments of the present invention, reference should be made to the accompanying drawings that illustrate these embodiments. However, the drawings depict only some embodiments of the invention, and should not be taken as limiting its scope. With this caveat, embodiments of the invention will be described and explained with additional specificity and detail through the use of the accompanying drawings in which.

DETAILED DESCRIPTION

In the following description, for purposes of explanation, numerous specific details are set forth in order to provide a thorough understanding of the invention. It will be apparent, however, to one skilled in the art that the invention can be practiced without these specific details.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
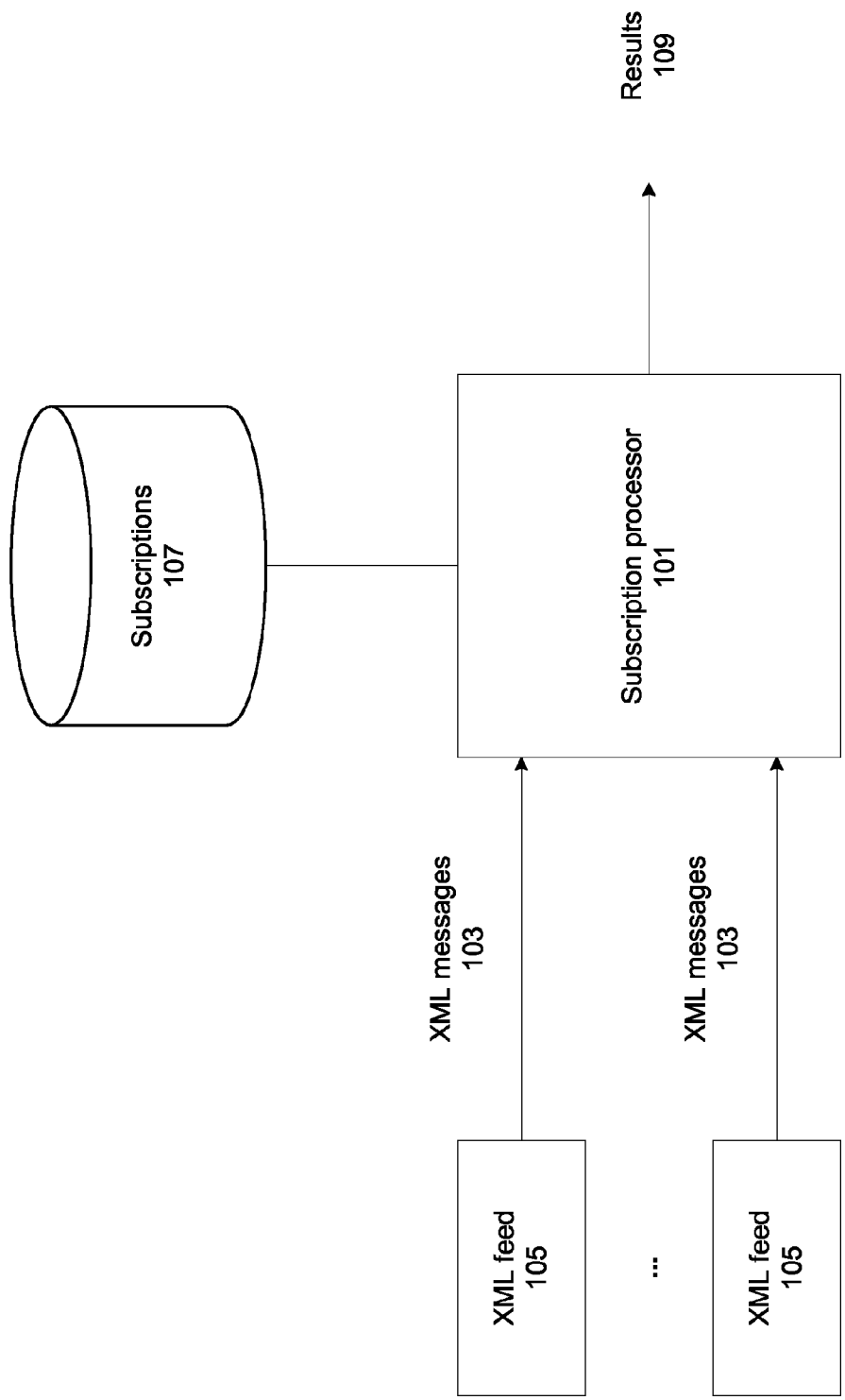
FIG. 1 is a block diagram showing a system for subscription processing, in accordance with an embodiment of the present invention.

FIG. 1 is a block diagram showing a system for subscription processing. A subscription processor 101 receives one or more XML (Extensible Markup Language) messages 103 from one more XML feeds 105, and processes the XML messages 103 according to a repository of message subscriptions 107. Example feeds include financial news, industry and market news, science news, political news, or special interest news items. Example feed providers include financial institutions, science and industry magazines, feed aggregators, etc.

The subscription processor 101 produces a set of processing results 109 which indicate which XML messages 103 satisfy which message subscriptions. This processing will now be described in more detail. It will be apparent to one skilled in the art that the invention can be practiced with feeds 105 that provide messages according to formats other than XML.

Figures 2A, 2B:
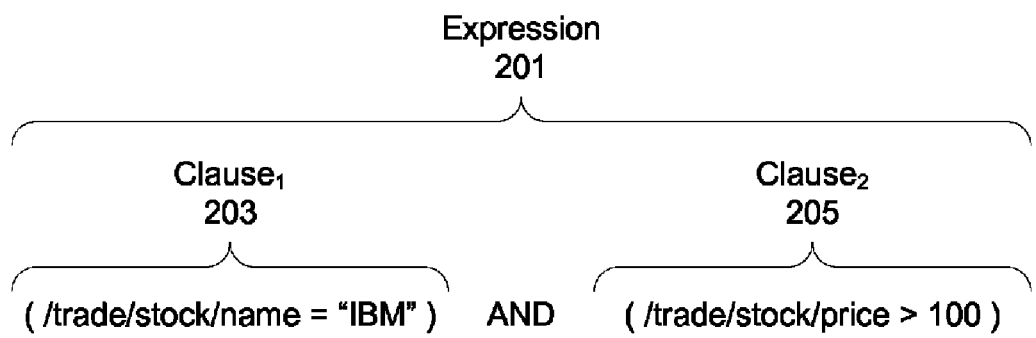
FIG. 2a shows a portion of an example XML message conveying information about a stock trade, in accordance with an embodiment of the present invention.
FIG. 2b shows an example of an expression used to define an example subscription, in accordance with an embodiment of the present invention.

For purposes of exemplary illustration, FIG. 2a shows a portion of an example XML message 103 comprising information about a stock trade. In particular, the snippet shows an example stock trade with "IBM" as the name of the stock and "150" as the trading price.

FIG. 2b shows an example of an expression 201 used to define an example subscription. In this example, expression 201 is a Boolean conjunction of two clauses. Clause$_1$ 203 evaluates to True when the name of the stock is "IBM", and Clause$_2$ 205 evaluates to True when the trading price is higher than $100. If both clauses evaluate to True, their conjunction in expression 201 evaluates to True, indicating that the XML message should be marked for delivery to the one or more subscribers indicated by this particular message subscription.

To process incoming messages according to a given subscription repository 107, the subscription processor 101 find a set of unique clauses in the repository 107, expresses the expressions (representing the subscriptions) as Boolean formulas of the unique clauses, and compiles the Boolean expressions into an assembly code-block for efficient expression evaluation. This allows subsequent processing of incoming XML messages into a set of True/False values assigned to the unique clauses, and efficient evaluation of the expressions by plugging in the True/False clause values into the assembly code-block. The result of the execution of the code-block is an indication of which incoming XML messages satisfy which subscriptions. This will now be described in more detail.

Figure 3:
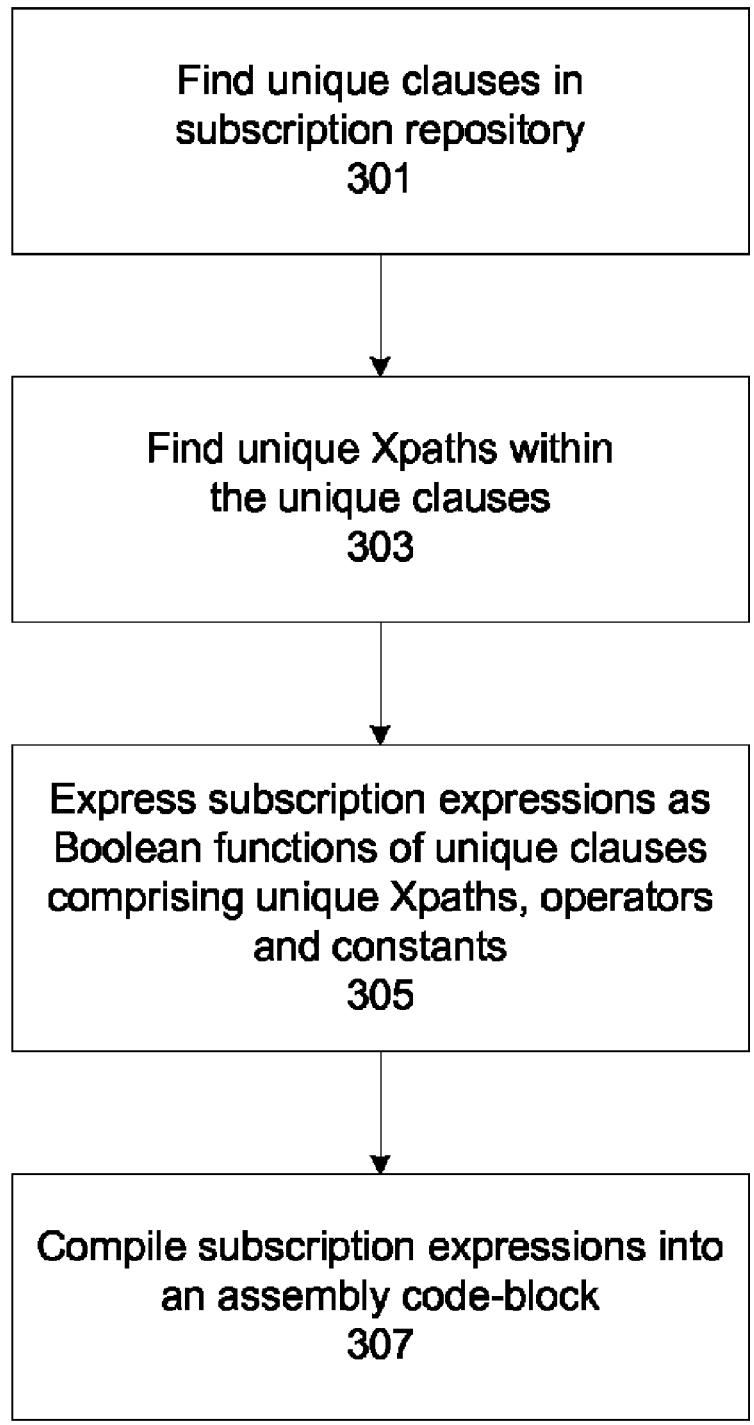
FIG. 3 is a flow diagram illustrating a method for generating a compiled code-block for expression evaluation, in accordance with an embodiment of the present invention.

FIG. 3 is a flow diagram illustrating a method for generating a compiled code-block for expression evaluation. Given a subscription repository 107 comprising expressions made up of Boolean combinations of clauses, step 301 finds the set of unique clauses among the set of all clauses in the subscription repository, since there may be common clauses among the subscriptions. For example, a subscription repository 107 may have 250 subscriptions comprising a total of 750 clauses, out of which 75 clauses are unique.

Step 303 finds the unique XPaths strings occurring in the set of unique clauses found at step 301. Note that XPath, as used herein, refers to a language for describing a way to locate and process items in XML documents by using an addressing syntax based on a path through the document's logical structure or hierarchy. As an example, the 75 unique clauses may comprise among them only 6 unique XPath strings, such as "/trade/stock/name", "/trade/stock/price", and other ones.

Step 305 expresses the subscription expressions as Boolean functions of the unique clauses, the unique clauses themselves expressed as unique XPath strings compared by an operator to a constant. An example of this is the expression "(/trade/stock/name=="IBM") AND (/trade/stock/price>100)", with the unique XPath strings "/trade/stock/name" and "/trade/stock/price", Operators "==" and ">", and constants "IBM" and "100". Finally, at step 307, the thusly expressed subscription expressions are compiled into an assembly code-block, such as the Intel™ x86 instruction set or any other assembly, machine language or other lower-level programming language that executes efficiently on a computing platform.

An example of such an assembly code-block, with the first expressions comprising (Clause$_1$ AND Clause$_2$), may be as follows:
MOVE C1, R1 MOVE Clause$_1$ into Register$_1$
AND C2, R1 AND Clause$_2$ into Register$_1$
MOVE R1, 0 (R4) MOVE Register$_1$ into an example location offset 0 bytes from Register$_4$ (e.g. Register$_4$ is the True/False expression array)
MOVE . . . Further analogous MOVE operations and Boolean computations for the next expression
. . .
MOVE R1, 71 (R4) MOVE Register$_1$ into the location offset 71 bytes from the expressions array, filling in the True/False value of the seventy-second expression into the expression array
. . .

As indicated, the output of such a code-block is an array (preferably of bytes to avoid costly shift operations) of True/False values indicating, for a given XML message, which of the subscriptions it satisfies. Alternatively, an array of bits, or words, or any other collection of bits to represent True/False values can be used.

Figure 4:
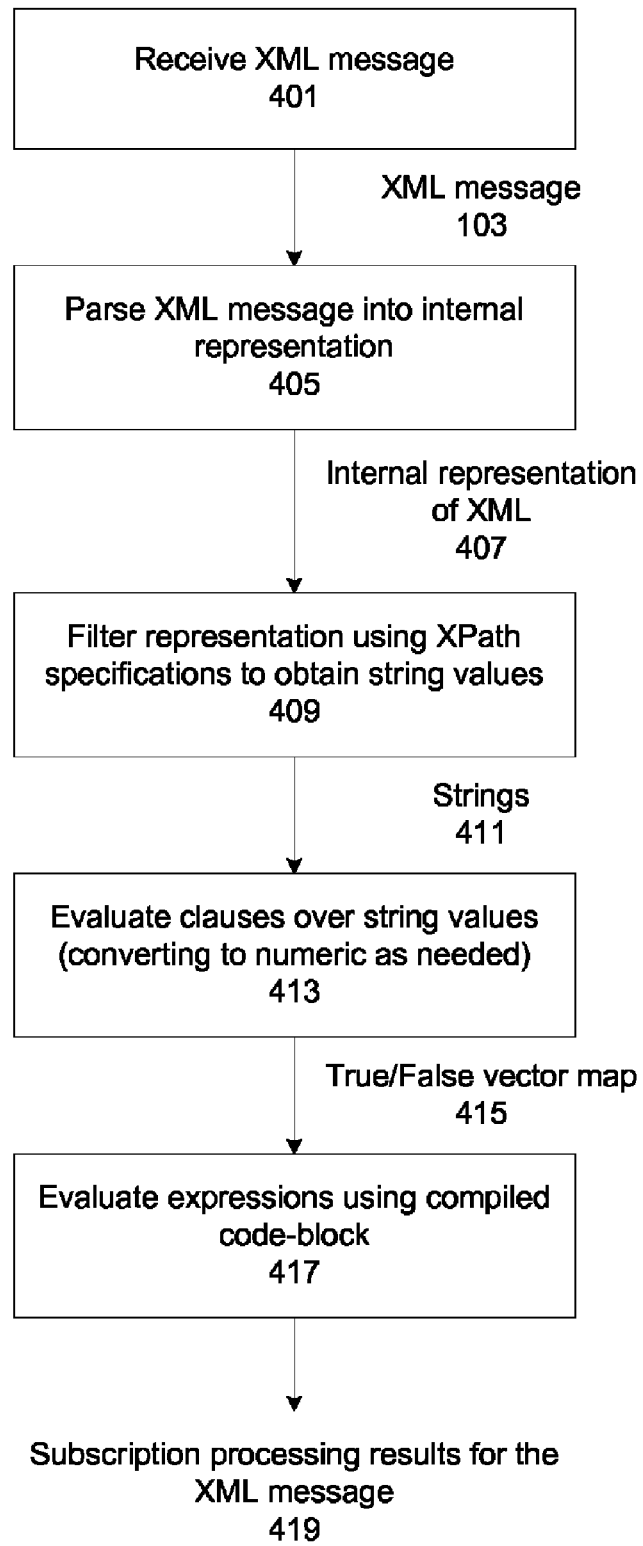
FIG. 4 is a flow diagram illustrating a method for subscription processing using a pre-compiled code-block for expression evaluation, in accordance with an embodiment of the present invention.

FIG. 4 is a flow diagram illustrating a method for subscription processing using a pre-compiled code-block for expression evaluation. Step 401 receives an XML message 103 from an incoming XML feed 105. Step 405 parses the received XML message 103 to produce an internal representation, such as a Document Object Model (DOM) structure, a set of arrays or structure as described in U.S. patent application Ser. No. 11/749,675 (hereinafter also referred to as Repax arrays or structures), a Document Table Model (DTM), or other parsed internal representation. As an example, the XML message 103 can be processed using Xerxes 2 XML parser for transforming XML documents into a DOM tree.

Step 409 applies an XPath filter to the internal representation of the XML message, producing a set of strings 411 representing values associated with corresponding XPaths (e.g. first string "IBM" and second string "150", as in the preceding example). Step 413 evaluates the clauses over the set of strings 411, producing a set of True/False values associated with the evaluated clauses (e.g. Clause$_1$ evaluates to True and Clause$_1$ evaluates to False).

Finally, step 417 evaluates the expressions based on the obtained True/False values of the clauses (e.g. the expression Clause$_1$ AND Clause$_2$ evaluates to False). This step produces a vector of True/False results indicating which subscriptions should receive the XML message 103. The expression evaluation is efficient since it is pre-compiled into assembly code and generates a vector of True/False values into a register.

In one embodiment, as new subscriptions arrive the assembly code-block is recompiled in a just-in-time (JIT) manner, thereby maintaining an up-to-date and efficient assembly code-block for evaluating subscription expressions in a manner that reflects the most current set of subscriptions in the subscription repository 107.

In one embodiment, the XPath strings can be multi-valued. An example of this is the clause "/trade/customers/customer {"Fred", "George", "Ginger"}". In such a case, clause evaluation takes on an additional complexity because of a membership test (versus a straight identity test) but is otherwise analogous.

It is an advantageous aspect of the present embodiments that while the subscription processor 101 is compiled once and executes, the compiled assembly code-block for the expression evaluation changes during run-time as new subscriptions arrive and the code-block is recompiled, thereby continually re-tuning the evaluation efficiency in the code-block without having to recompile the entire subscription processor 101.

Optionally, the parser can perform floating point evaluations. For example, when the parser encounters the string "100", it can save the floating point number 100 in binary in the assembly code-block.

Optionally, the subscription processor 101 maintains a history comprising a message repository to bring new subscribers up to speed with the latest news; such messages can be saved in the pre-parsed internal representation to allow for increased processing speed as compared to storing straight XML messages.

Optionally, instead of sending straight XML messages to subscribers, the subscription processor 101 sends parsed messages, exposing the internal representation, to the subscribers (optionally accompanied alongside the XML message), thereby saving on parsing computations on the subscriber (or client) side.

Optionally, as parsed messages and/or Repax structures of matching subscriptions are sent to subscribers, the subscription processor 101 performs one or more Extensible Stylesheet Language Transformation (XSLT) transforms on the messages or structures prior to sending to subscribers, with such XSLT transforms based on subscribers' preferred message formats. For example, a subscriber may expect the string "Company_Name" instead of the string "Company" when receiving incoming messages. In such a case, the subscription processor 101 modifies the string "company" to "Company_Name" to match subscriber-requested format prior to sending to the subscriber. This way, the subscription processor 101 can deliver customized data to subscribers, with the customizations matching particular formats requested by each particular subscriber.

Optionally, the subscription processor 101 performs load-balancing or XML routing to route XML messages (or pre-parsed messages) to dedicated servers, with the routing based on keywords or XPath strings in the associated XML messages.

Optionally, the operators used for defining subscriptions are user-extensible. In such an embodiment, a user may specify an operator-name as well as a pointer to a function (code-block) for implementing the operator, and the subscriptions processor 101 can be extended at link-time to include the new operator. In general, a new operator can be any code that takes two strings as input and returns True/False as output. Other operators, such as those taking more than two arguments or taking argument types other than strings, can be added analogously as will be apparent to one skilled in the art.

While certain exemplary embodiments have been described and shown in the accompanying drawings, it is to be understood that such embodiments are merely illustrative and not restrictive of the broad invention and that this invention is not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principals of the present disclosure or the scope of the accompanying claims.

I claim:

1. A method for processing message subscriptions, comprising:
    finding a set of unique clauses in a plurality of subscriptions to one or more message feeds, each of the plurality of subscriptions comprising a subscription expression indicating message information of interest;
    expressing the subscription expressions of the plurality of subscriptions as Boolean combinations of the set of unique clauses;
    compiling the subscription expressions expressed as the Boolean combination of the set of unique clauses into a machine language code-block;
    receiving a message from the one or more message feeds;
    associating a set of true or false values with the unique clauses, wherein a true value is associated with each unique clause in which information in the received message satisfies, wherein a false value is associated with each unique clause in which the information in the received message does not satisfy;
    inputting the set of true or false values associated with the unique clauses into the compiled machine language code-block; and
    determining whether the received message satisfies any of the plurality of subscriptions by executing the compiled machine language code-block, wherein the determining comprises:
        evaluating a true or false value for each of the subscription expressions using the inputted set of true or false values associated with the unique clauses; and
        outputting a vector marking the received message for delivery for each subscription comprising the subscription expression evaluated with the true value.

2. The method of claim 1, wherein the compiled machine language code-block comprises machine language assembly instructions.

3. The method of claim 1, further comprising:
    receiving a new subscription; and
    recompiling the machine language code-block at run-time to include subscription expressions of the new subscription.

4. The method of claim 1, wherein the associating comprises:
    parsing the received message into a set of values;
    evaluating each of the set of unique clauses over the set of values;
    producing a true value for each unique clause evaluated to be true; and
    producing a false value for each unique clause evaluated to be false.

5. The method of claim 4, wherein the received message comprises a tag/value pair, wherein the parsing comprises:
    parsing the received message to produce an internal representation of the received message;
    applying a field specifier to the internal representation of the message; and
    producing the set of values associated with a corresponding field specifier.

6. The method of claim 1, wherein the evaluating comprises:
    evaluating a true or false value for the Boolean combination of each subscription expression from the inputted set of true or false values associated with the unique clauses; and
    for each subscription expression, storing the evaluated true or false value for the Boolean combination of the subscription expression in a location within the vector corresponding to the subscription expression.

7. A system for processing message subscriptions, comprising:
    a memory element for storing a set of expressions representing a plurality of message subscriptions;
    a processor; and
    a computer readable storage medium having a computer readable program, wherein the computer readable program when executed by the processor causes the system to:
        find a set of unique clauses in the plurality of subscriptions to one or more message feeds, each of the plurality of subscriptions comprising a subscription expression indicating message information of interest;
        express the subscription expressions of the plurality of subscriptions as Boolean combinations of the set of unique clauses;
        compile the subscription expressions expressed as the Boolean combination of the set of unique clauses into a machine language code-block;
        receive a message from the one or more message feeds;
        associate a set of true or false values with the unique clauses, wherein the true value is associated with each unique clause in which information in the received message satisfies, wherein a false value is associated with each unique clause in which the information in the received message does not satisfy;

input the set of true or false values associated with the unique clauses into the compiled machine language code-block; and determine whether the received message satisfies any of the plurality of subscriptions by executing the compiled machine language code-block, wherein the determine comprises:

evaluate a true or false value for each of the subscription expressions using the inputted set of true or false values associated with the unique clauses; and output a vector marking the received message for delivery for each subscription comprising the subscription expression evaluated with the true value.

8. The system of claim 7, wherein the compiled machine language code-block comprises machine language assembly instructions.

9. The system of claim 7, wherein the computer readable program when executed by the processor causes the system further to:

receive a new message subscription; and recompile the machine language code-block at run-time to include the subscription expressions of the new subscription.

10. The system of claim 7, wherein the associate comprises:

parse the received message into a set of values;

evaluate each of the set of unique clauses over the set of values;

produce a true value for each unique clause evaluated to be true; and produce a false value for each unique clause evaluated to be false.

11. The system of claim 10, wherein the received message comprises a tag/value pair, wherein the parse comprises:

parse the received message to produce an internal representation of the received message;

apply a field specifier to the internal representation of the received message; and produce the set of values associated with a corresponding field specifier.

12. The system of claim 7, wherein the evaluate comprises:

evaluate a true or false value for the Boolean combination of each subscription expression from the inputted set of true or false values associated with the unique clauses; and for each subscription expression, store the evaluated true or false value for the Boolean combination of the subscription expression in a location within the vector corresponding to the subscription expression.

13. A non-transitory computer-readable medium having a computer readable program for processing message subscriptions, wherein the computer readable program when executed on a computer causes the computer to:

find a set of unique clauses in a plurality of subscriptions to one or more message feeds, each of the plurality of subscriptions comprising a subscription expression indicating message information of interest;

express the subscription expressions of the plurality of subscriptions as the Boolean combination of the set of unique clauses;

compile the subscription expressions expressed as the Boolean combination of the set of unique clauses into a machine language code-block;

receive a message from the one or more message feeds;

associate a set of true or false values with the unique clauses, wherein a true value is associated with each unique clause in which information in the received message satisfies, wherein a false value is associated with each unique clause in which the information in the received message does not satisfy;

input the set of true or false values associated with the unique clauses into the compiled machine language code-block; and determine whether the received message satisfies any of the plurality of subscriptions by executing the compiled machine language code-block, wherein the determine comprises:

evaluate a true or false value for each of the subscription expressions using the inputted set of true or false values associated with the unique clauses; and output a vector marking the received message for delivery for each subscription comprising the subscription expression evaluated with the true value.

14. The non-transitory computer readable medium of claim 13, wherein the computer readable program when executed on the computer further causes the computer to:

receive a new message subscription; and recompile the machine language code-block at run-time to include the subscription expressions of the new subscription.

15. The non-transitory computer readable medium of claim 13, wherein the compiled machine language code-block comprises machine language assembly instructions.

16. The non-transitory computer readable-medium of claim 13, wherein the associate comprises:

parse the received message into a set of values;

evaluate each of the set of unique clauses over the set of values;

produce a true value for each unique clause evaluated to be true; and produce a false value for each unique clause evaluated to be false.

17. The non-transitory computer readable medium of claim 16, wherein the received message comprises a tag/value pair, wherein the parse comprises:

parse the received message to produce an internal representation of the received message;

apply a field specifier to the internal representation of the received message; and produce the set of values representing values associated with a corresponding field specifier.

18. The non-transitory computer readable medium of claim 13, wherein the evaluate comprises:

evaluate a true or false value for the Boolean combination of each subscription expression from the inputted set of true or false values associated with the unique clauses; and for each subscription expression, store the evaluated true or false value for the Boolean combination of the subscription expression in a location within the vector corresponding to the subscription expression.

* * * * *